US008639773B2

(12) United States Patent
Shyamkumar et al.

(10) Patent No.: US 8,639,773 B2
(45) Date of Patent: Jan. 28, 2014

(54) DISCREPANCY DETECTION FOR WEB CRAWLING

(75) Inventors: Balaji B. Shyamkumar, Sammamish, WA (US); Puneet Sahni, Bellevue, WA (US); Harsh Verma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 12/817,797

(22) Filed: Jun. 17, 2010

(65) Prior Publication Data

US 2011/0314122 A1    Dec. 22, 2011

(51) Int. Cl.
G06F 15/16    (2006.01)

(52) U.S. Cl.
USPC .............................. 709/217; 715/772; 709/207

(58) Field of Classification Search
USPC .......................................................... 709/217
See application file for complete search history.

(56) References Cited

U.S. PATENT DOCUMENTS

| | | | | |
|---|---|---|---|---|
| 6,801,906 | B1 * | 10/2004 | Bates et al. | 707/707 |
| 7,219,148 | B2 | 5/2007 | Rounthwaite et al. | |
| 7,797,344 | B2 * | 9/2010 | Kaul et al. | 707/791 |
| 7,836,108 | B1 * | 11/2010 | Kupke et al. | 707/826 |
| 7,853,589 | B2 * | 12/2010 | Svore et al. | 707/728 |
| 8,078,629 | B2 * | 12/2011 | Patterson | 707/754 |
| 2005/0165778 | A1 * | 7/2005 | Obata et al. | 707/5 |
| 2006/0136411 | A1 | 6/2006 | Meyerzon et al. | |
| 2006/0184500 | A1 * | 8/2006 | Najork et al. | 707/1 |
| 2007/0061303 | A1 * | 3/2007 | Ramer et al. | 707/3 |
| 2007/0100653 | A1 * | 5/2007 | Ramer et al. | 705/1 |
| 2007/0174267 | A1 * | 7/2007 | Patterson et al. | 707/5 |
| 2007/0250468 | A1 * | 10/2007 | Pieper | 707/1 |
| 2008/0208561 | A1 * | 8/2008 | Bronstad et al. | 703/22 |
| 2008/0320119 | A1 | 12/2008 | Achan et al. | |
| 2009/0125372 | A1 * | 5/2009 | van Zwol et al. | 705/10 |
| 2009/0125510 | A1 * | 5/2009 | Graham et al. | 707/5 |
| 2010/0076910 | A1 * | 3/2010 | Gao et al. | 706/11 |
| 2010/0082590 | A1 * | 4/2010 | Nye | 707/706 |
| 2010/0082618 | A1 * | 4/2010 | Ott et al. | 707/730 |
| 2010/0088428 | A1 * | 4/2010 | Hendrickson et al. | 709/242 |
| 2010/0131563 | A1 * | 5/2010 | Yin | 707/794 |
| 2010/0138425 | A1 * | 6/2010 | Lin et al. | 707/741 |
| 2010/0158395 | A1 * | 6/2010 | Sathish et al. | 382/224 |

(Continued)

OTHER PUBLICATIONS

Castillo; et al., "Query-Log Mining for Detecting Polysemy and Spam"—Published Date: 2008 http://www.chato.cl/papers/ccdfg_2008_polysemy_spam.pdf.

(Continued)

*Primary Examiner* — Hamza Algibhah
(74) *Attorney, Agent, or Firm* — Microsoft Corporation (57) ABSTRACT

Search engines may utilize web crawlers to discover desirable content that may be provided to users as search results. Unfortunately, document providers, such as websites, may return junk web pages and/or maintenance web pages as document results, which may be undesirable for a search engine to provide as search results. Accordingly, document providers may be grouped into provider clusters. Profiles may be assigned to provider clusters, where a profile may comprise parameters representing "expected" parameters historically returned from normal document fetch operations to document providers within the provider cluster. Parameters of a profile for a provider cluster comprising a document provider may be compared with current document fetch parameters of a current document fetch operation. If the parameters of the profile and the current document fetch parameters do not match, then an alert may be generated.

20 Claims, 9 Drawing Sheets

(56) References Cited

U.S. PATENT DOCUMENTS

| | | | | |
|---|---|---|---|---|
| 2010/0169300 | A1* | 7/2010 | Liu et al. | 707/709 |
| 2010/0185611 | A1* | 7/2010 | Liao et al. | 707/728 |
| 2010/0205168 | A1* | 8/2010 | Yang et al. | 707/709 |
| 2010/0250516 | A1* | 9/2010 | Maykov et al. | 707/709 |
| 2010/0257169 | A1* | 10/2010 | Kim et al. | 707/737 |
| 2010/0299322 | A1* | 11/2010 | Zhang | 707/722 |
| 2011/0066607 | A1* | 3/2011 | Wong | 707/706 |
| 2011/0082859 | A1* | 4/2011 | Deng et al. | 707/728 |
| 2011/0137882 | A1* | 6/2011 | Weerasinghe | 707/707 |
| 2011/0173197 | A1* | 7/2011 | Mehta et al. | 707/737 |
| 2011/0184932 | A1* | 7/2011 | Hennum et al. | 707/711 |
| 2011/0197237 | A1* | 8/2011 | Turner | 725/78 |
| 2011/0252121 | A1* | 10/2011 | Borgs et al. | 709/223 |
| 2011/0264641 | A1* | 10/2011 | Yang et al. | 707/706 |
| 2011/0302155 | A1* | 12/2011 | Yan et al. | 707/723 |
| 2011/0307425 | A1* | 12/2011 | Wang et al. | 706/12 |

OTHER PUBLICATIONS

Vikas; et al., "WebMiner—Anatomy of Super Peer based Incremental Topic-Specific Web Crawler"—Published Date: Apr. 22, 2007 http://ieeexplore.ieee.org/stamp/stamp.jsp?arnumber=4196225&isnumber=4196187.

Ackland; et al., "Characteristics of .au Websites: An Analysis of Large-Scale Web Crawl Data from 2005"—Published Date: 2005 http://www.turpentine.com/peole/peter/papers/Ackland-SB-Characteristics-AU-Websites-2007.pdf.

Pinkerton, Brain, "WebCrawler: Finding What People Want"—Published Date: 2000 http://thinkpink.com/bp/Thesis/Thesis.pdf.

"Software Listing: Isapi Filter"—Published Date: Apr. 23, 2004 http://www.sharewareconnection.com/titles/isapi-filter.htm.

Thelwall, Mike, "Web Log File Analysis: Backlinks and Queries"—Published Date: 2001 http://wlv.openrepository.com/wlv/bitstream/2436/3144/1/2001_Web_Log_File_Analysis_Backlinks_and_Queries.pdf.

* cited by examiner

DISCREPANCY DETECTION FOR WEB CRAWLING

BACKGROUND

Many internet users discover and interact with internet documents using search queries. For example, a user may search for websites, images, videos, and other internet documents by submitting a query to a search engine. A search engine may crawl the web to fetch millions of documents that may be used as search results (e.g., a web crawler may fetch images, articles, and/or other documents from websites). It follows that the quality of search results provided by the search engine may be based upon the desirability of the fetched documents that the search engine retrieves. Unfortunately, undesirable documents may be fetched from document providers. In one example, a website may perform a soft block by silently redirecting a web crawler to a junk page because the website may perceive the web crawler as potentially rude. In another example, a website may be down for maintenance or unexpected downtime, and thus a web crawler may be directed to a maintenance page. The junk page and/or maintenance page may be undesirable documents to provide as search engine results.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for grouping document providers into provider clusters comprising profiles are disclosed herein. It may be appreciated that a document may be interpreted as electronic content (e.g., a text document, an article within a web page, an image within a database, a web page, a music file, text, web service data, an application, and/or a wide variety of content accessible through the internet). A document provider may be interpreted as an entity that provides documents (e.g., a website, a web service, a database, a web application, a web host, and/or a variety of other entities that provide electronic content for consumption).

Search engines may utilize web crawling technology to fetch documents from document providers by issuing document fetch operations. For example, a document fetch operation may fetch a news article from a news website. During a document fetch operation, document fetch parameters (e.g., document size parameter, http status code parameters, mime type parameter, redirection parameter, and/or a variety of other parameters) may be determined. For example, an http header associated with a document fetch operation to a document provider may be analyzed to determine one or more document fetch parameters associated with the document fetch operation. It may be appreciated that document fetch data of a document provider may be interpreted as a collection of document fetch parameters corresponding to one or more previously executed document fetch operations associated with the document provider.

Document fetch data for one or more document providers may be received. For example, document fetch data for a car website (document provider) comprising document fetch parameters (e.g., document size) associated one or more document fetch operations to the car website (e.g., a car article fetch (1), a car image fetch (1), a car image fetch (2), etc.) may be received. Document providers may be grouped into provider clusters based upon document fetch data. In one example, document providers having a document fetch frequency (e.g., a web crawler fetches documents 30 times an hour) may be placed within a provider cluster having a corresponding document fetch frequency category (e.g., fetch frequency between 20 and 30 times an hour). In this way, document providers having similar document fetch parameters (e.g., document fetch frequencies) may be grouped together in provider clusters. It may be appreciated that document providers may not literally be grouped into provider clusters, but references to document providers may be grouped into provider clusters. For example, references to a car website, a news website, and a game review website may be grouped into a provider cluster, as opposed to grouping the actual websites into the provider clusters.

A profile may be specified for the respective provider clusters based upon document fetch parameters of document providers within the respective provider clusters. A profile may comprise parameters corresponding to document size, frequency of http status codes, mine types, redirect rates, etc. The parameters of a profile for a provider cluster may be specified based upon document fetch parameters of document providers within the provider cluster. For example, a document size parameter comprising a range of acceptable document size values may be specified for a profile of a provider cluster based upon document fetch parameters of document providers within the provider cluster, where the document fetch parameters correspond to document sizes of documents fetched from the document providers. In this way, a provider cluster may comprise a profile specifying "expected" parameter values that may be returned when a document fetch operation is performed to document providers within the provider cluster. It may be appreciated that document fetch parameters of subsequent document fetch operations to a document provider that are outside the parameters of a profile associated with a provider cluster comprising the document provider may be an indicator that the document provider is returning "out of the norm" documents that may be undesirable.

Additionally, a profile may be used to determine whether a document provider is returning documents having "expected" document fetch parameters, or conversely, the document provider is returning "out of the norm" documents based upon a discrepancy between document fetch parameters of fetched documents and parameters of a profile. In particular, a current document fetch operation to a document provider may be performed. The current document fetch operation may be associated with current document fetch data comprising current document fetch parameters (e.g., document size, mime type, redirection, etc.). The current document fetch parameters of the current document fetch operation may be compared with parameters of a profile associated with a provider cluster comprising the document provider. It may be appreciated that the parameters of the profile may indicate "expected" parameters that the document provider may return when desirable documents are returned. If the comparison indicates a discrepancy between the current document fetch parameters and the parameters of the profile, then an alert may be generated. In this way, the alert may indicate that the document provider may be returning undesirable documents that a web crawler may not want to fetch, and thus further investigation may be performed to inhibit fetching of undesirable documents as potential search results.

To the accomplishment of the foregoing and related ends, the following description and annexed drawings set forth certain illustrative aspects and implementations. These are

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many search engines utilize web crawling technology to discover documents (e.g., images, web pages, articles, blogs, videos, music, and/or other electronic content) that may be provided as search results. Desired documents may be interpreted as documents fetched by a web crawler that are "expected" and/or would be useful to provide to users as search engine results. Undesired documents may be interpreted as documents fetched by a web crawler that comprise spam, junk web pages, maintenance pages, and/or other content that may not be useful and/or may be embarrassing to provide to users as search engine results. Thus, it may be advantageous to identify undesirable documents so that such documents may be excluded from search results. Additionally, identified undesirable documents may be used as augmented training sets to train junk page classifiers to detect similar documents as junk pages.

Accordingly, among other things, one or more systems and/or techniques for grouping document providers into provider clusters comprising profiles are provided herein. In particular, document providers (e.g., web page providers) having similar document fetch parameters (e.g., documents having similar document sizes; web pages having documents that are fetched at a similar frequency, web pages returning a similar rate of redirects, etc.) may be grouped into provider clusters. Profiles comprising parameters may be specified for provider clusters, such that parameters of a profile may reflect document fetch parameters that document providers may be "expected" to return when normal/desirable documents are fetched. That is, parameters of a profile may reflect "expected" document fetch parameters returned from document fetch operations to a document provider when the document provider returns desired documents (e.g., a sought after article, as opposed to a generic error). Current document fetch operations may be compared with a profile to determine whether the document returned by a document provider is "normal" and/or "expected". For example, current document fetch parameters of a current document fetch operation to a document provider may be compared with parameters of a profile associated with a provider cluster comprising the document provider. If there is a discrepancy between the current document fetch parameters and the "expected" parameters of the profile, then an alert may be generated.

Figure 1:
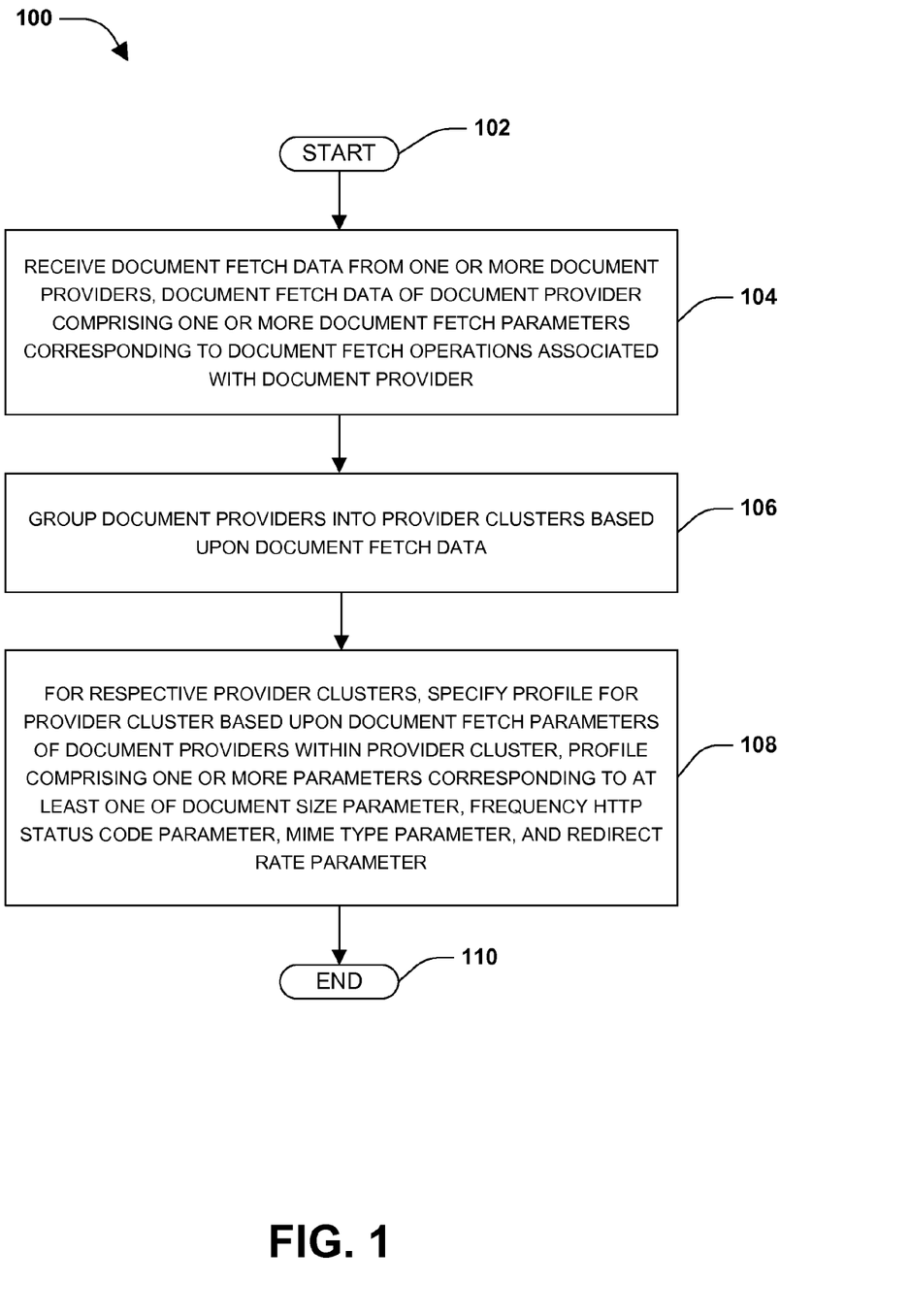
FIG. 1 is a flow chart illustrating an exemplary method of grouping document providers into provider clusters comprising profiles.

One embodiment of grouping document providers into provider clusters comprising profiles is illustrated by an exemplary method 100 in FIG. 1. At 102, the method starts. At 104, document fetch data of one or more document providers may be received (e.g., document fetch data of one or more document providers 402 of FIG. 4). Document fetch data of a document provider may comprise one or more document fetch parameters corresponding to document fetch operations associated with the document provider. For example, document fetch data of a document provider may comprise historical data of previous document fetch operations (e.g., get document from news web page, get article from news web page, get images from news web page, etc.) and their respective document fetch parameters (e.g., get document operation was redirected, get article operation returned a document having a document size of 100 kb, get images returned a http status code 302 and 303, etc.). In one example, document fetch parameters for a document provider may be determined using http headers associated with document fetch operations to the document provider.

At 106, document providers may be grouped into provider clusters based upon document fetch data. In one example, document providers having a document fetch frequency of 10 to 20 fetches an hour (e.g., content is fetched from respective providers at this frequency) may be grouped into a first provider cluster having a corresponding document fetch frequency category; document providers having a document fetch frequency between 21 and 50 fetches an hour may be grouped into a second provider cluster having a corresponding document fetch frequency category; etc. It may be appreciated that document providers may be grouped into provider clusters based upon a variety of criteria specified within the document fetch data (e.g., document fetch frequency, document size, frequency of http status codes, and/or a variety of other parameters or information relating to the document provider (e.g., popularity of the document provider, types of documents generally fetched from the document provider, etc.)).

At 108, for respective provider clusters, a profile may be specified for a provider cluster based upon document fetch parameters of document providers within the provider cluster. For example, the profile may comprise one or more parameters corresponding to document size parameters (e.g., an average size of documents fetched from document providers), frequency http status code parameters (e.g., how often document providers returned a particular http status code in response to document fetch operations), a mime type parameter (e.g., mime type parameters generally returned by document providers), a redirect rate parameter (e.g., a rate at which document providers return a redirected page in response to document fetch operations), and/or a variety of other parameters indicative of "expected" parameters that document providers within the provider cluster may exhibit. In one example, a parameter of a profile for a provider cluster may have a range of acceptable values based upon a percentage of document providers within the provider cluster having corresponding document fetch parameters within the range of acceptable values.

A profile for a cluster comprising a document provider may be used to evaluate documents returned by the document provider to determine whether the documents are desirable (e.g., not junk or maintenance pages). In one example, a current document fetch operation to a document provider to fetch a document may be performed. The current document fetch operation may be associated with current document fetch data comprising current document fetch parameters. The current document fetch parameters (e.g., document size, mime type, etc.) of the current document fetch operation may be compared with parameters of a profile associated with a provider cluster comprising the document provider. In one example, the comparison may be performed in real-time during a web crawl session comprising the current document fetch operation. In another example, the comparison may be performed offline. If the comparison indicate a discrepancy between the current document fetch parameters and one or more of the parameters of the profile, then an alert may be generated (e.g., a current document fetch parameter may specify a document size outside of an acceptable value range specified by a document size parameter of the profile).

In another example, the comparison may be performed after multiple current document fetch operations are performed. In particular, a plurality of current document fetch operations to a document provider may be performed to generate a computed current document fetch parameter (e.g., a computed average of a current document fetch parameter and/or a computed standard deviation of the current document fetch parameter). The computed current document fetch parameters associated with the document provider may be compared with parameters of a profile associated with a provider cluster comprising the document provider. If the comparison indicates a discrepancy between the computed current document fetch parameters and one or more of the parameters of the profile, then an alert may be generated.

To adjust for changes related to fetched documents from document providers (e.g., a fetch frequency decreases, an average document size increases, etc.), document providers may be regrouped into new provider clusters. For example, a document provider having a frequency of alerts rising above a predetermined threshold may be regrouped into a different provider cluster having a profile similar to the current fetch data of the document provider. Additionally, a profile of a provider cluster may be updated based upon one or more document providers within the provider cluster having a frequency of alerts rising above a predetermined threshold, for example. In one example, averages and/or standard deviations may be used for reclustering (and/or clustering). For example, averages and/or standard deviations may be calculated for some or all parameters of some or all providers. Providers that have averages for one or more parameters that fall within 2 standard deviations, for example, of the averages of a cluster or one another can be grouped together.

In one example, an alert may indicate that a document provider is returning junk web pages (undesirable documents) to a web crawler in response to current document fetch operations because bandwidth of the document provider is being over-consumed by the web crawler. In this way, if a frequency of alerts for the document provider rises above a predetermined threshold, then the frequency of performing current document fetch operations to the document provider may be throttled (e.g., current document fetch operations may be performed less frequently). At 110, the method ends.

Figure 2:
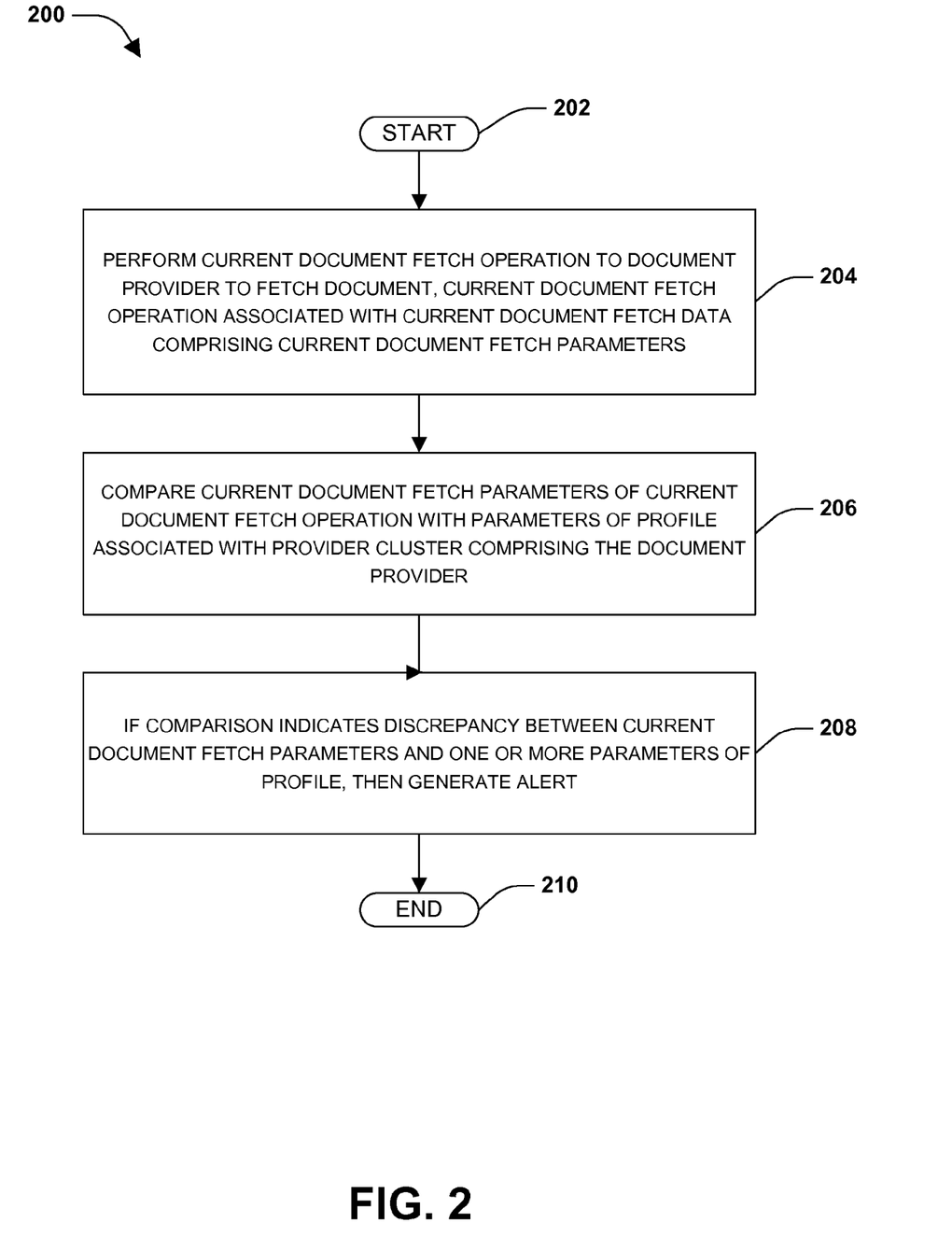
FIG. 2 is a flow chart illustrating an exemplary method of comparing current document fetch parameters with parameters of a profile.

One embodiment of comparing current document fetch parameters with parameters of a profile is illustrated by an exemplary method 200 in FIG. 2. At 202, the method starts. At 204, a current document fetch operation to a document provider to a fetch a document may be performed. The current document fetch operation may be associated with current document fetch data comprising current document fetch parameters. At 206, the current document fetch parameters of the current document fetch operation may be compared with parameters of a profile associated with a provider cluster comprising the document provider. At 208, if the comparison indicates a discrepancy between the current document fetch parameters and one or more of the parameter of the profile, then an alert may be generated. For example, the alert may be sent within an email to an individual that may manually check the document provider to determine whether junk and/or maintenance pages are returned as documents, which may be undesirable to use as search results. At 210, the method ends.

Figure 3:
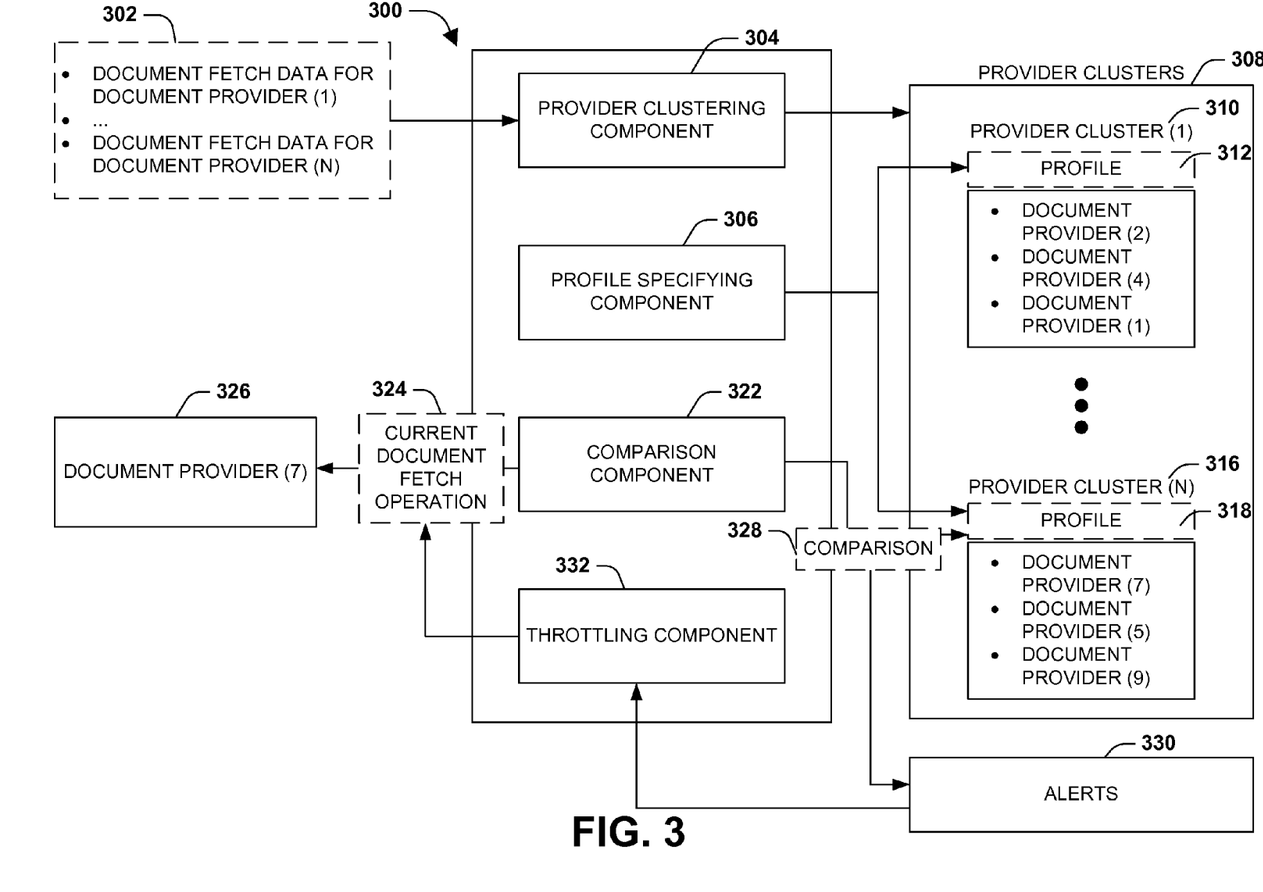
FIG. 3 is a component block diagram illustrating an exemplary system for grouping document providers into provider clusters comprising profiles.

FIG. 3 illustrates an example of a system 300 configured to group document providers into provider clusters 308 comprising profiles. The system 300 may comprise a provider clustering component 304, a profile specifying component 306, a comparison component 322, and/or a throttling component 332. The provider clustering component 304 may be configured to retrieve document fetch data 302 for one or more document providers (e.g., document fetch data for document provider (1), document fetch data for document provider (2), etc.). Document fetch data of a document provider may comprise one or more document fetch parameters corresponding to document fetch operations associated with the document provider. For example, document fetch data (e.g., historical data) for document provider (1) may comprise information related to 50 previous document fetch operations to document provider (1) for documents, such as articles, images, and/or other content. Respective document fetch operations may comprise document fetch parameters, such as how large a document was returned by the document provider, did the document provider redirect a web crawler, etc. In this way, document fetch data may be used to determine groups of document providers having similar attributes (e.g., a group of document providers that historically return documents having a size range from 1 mb to 3 mb).

The provider clustering component 304 may be configured to group document providers into provider clusters 308 based upon document fetch data 302. For example, document provider (2), document provider (4), and document provider (1) may be grouped into provider cluster (1) 310 because the respective document providers have at least some similar document fetch data (e.g., document fetch frequency for the document providers was between 20 and 30 fetches an hour, and the provider cluster (1) 310 has a document fetch frequency category of 20 to 30). Document provider (7), document provider (5), and document provider (9) may be grouped into provider cluster (N) 316 because the respective document providers have at least some similar document fetch data (e.g., document fetch frequency for the document providers was between 31 and 50 fetches an hour, and the provider cluster (N) has a document fetch frequency category of 31 to 50).

The profile specifying component 306 may be configured to specify profiles for provider clusters based upon document fetch parameters of document providers within the provider clusters 308. For example, the profile specifying component 306 may specify a profile 312 having parameters derived from document fetch parameters of document provider (2), document provider (4), and document provider (1). The profile specifying component 306 may specify a profile 318 having parameters derived from document fetch parameters of document provider (7), document provider (5), and document provider (9). In this way, a profile for a provider cluster may indicate "expected" document fetch parameters that document providers historically exhibited when document fetch operations were performed to the respective document providers. It may be appreciated that a profile may comprise one or more parameters corresponding to at least one of a document size parameter, a frequency http status code parameter, a mime type parameter, a redirect rate parameter, and/or a variety of other parameters related to a document provider.

The comparison component 322 may be configured to perform a current document fetch operation 324 to a document provider (e.g., document provider (7) 326) to fetch a document (e.g., the comparison component 322 may invoke a web crawler to fetch an article from a web page). The current document fetch operation 324 may be associated with current document fetch data comprising current document fetch parameters, which may be comprised within fetch data 302 in one example. The comparison component 322 may be configured to compare (comparison 328) the current document fetch parameters of the current document fetch operation 324 with parameters of a profile associated with a provider cluster comprising the document provider. For example, current document fetch parameters may be compared with parameters of the profile 318 for the provider cluster (N) 316 comprising the document provider (7). If the comparison indicates a discrepancy between the current document fetch parameters and one or more of the parameters of the profile 318, then an alert may be generated (alerts 330). In one example, the comparison may be performed in real-time during a web crawl session comprising the current document fetch operation 324. In another example, the comparison may be performed offline.

The comparison component 322 may be configured to perform a plurality of current document fetch operations before a comparison is made. In particular, the comparison component 322 may be configured to perform a plurality of current document fetch operations to a document provider (e.g., the document provider (7) 326) to generate computed current document fetch parameters (e.g., an average value and/or standard deviation for document fetch parameters). The comparison component 322 may compare the computed current document fetch parameters associated with the document provider (7) 326 with parameters of the profile 318 associated with the provider cluster (N) 316 comprising the document provider (7). If the comparison indicates a discrepancy between the computed current document fetch parameters and one or more parameters of the profile 318, then an alert may be generated (alerts 330).

The profile specifying component 306 may be configured to regroup document providers into new provider clusters based upon a frequency of alerts for the document provider rising above a predetermined threshold. For example, a large number of alerts may occur with regard to document provider (4) because document provider (4) may consistently return documents having document sizes (e.g., current document fetch parameters having a size of 4 mb) larger than acceptable document size values within the profile 312 (e.g., document size parameter between 1 mb and 2 mb). In this way, the profile specifying component 306 may regroup document provider (4) into a provider cluster having a profile with a document size parameter closer to 4 mb.

The profile specifying component 306 may be configured to update a profile of a provider cluster based upon one or more document providers within the provider cluster having a frequency of alerts rising above a predetermined threshold. For example, document provider (2) and document provider (1) within provider cluster (1) 310 may have a large number of alerts occurring with respect to current document fetch operations to the respective document providers. The profile specifying component 306 may update the profile 312 by adjusting one or more parameters to reflect current document fetch parameters of the respective document providers.

The throttling component 332 may be configured to throttle a frequency of performing current document fetch operations to a document provider based upon a frequency of alerts for the document provider rising above a predetermined threshold. For example, a large number of alerts may occur with regard to document provider (5). The alerts may be an indication that document provider (5) is returning junk pages because document provider (5) may have determined that the comparison component 322 was performing current document fetch operations too frequently. Thus, the throttling component 332 may throttle down the frequency at which current document fetch operations are perform to document provider (5).

Figure 4:
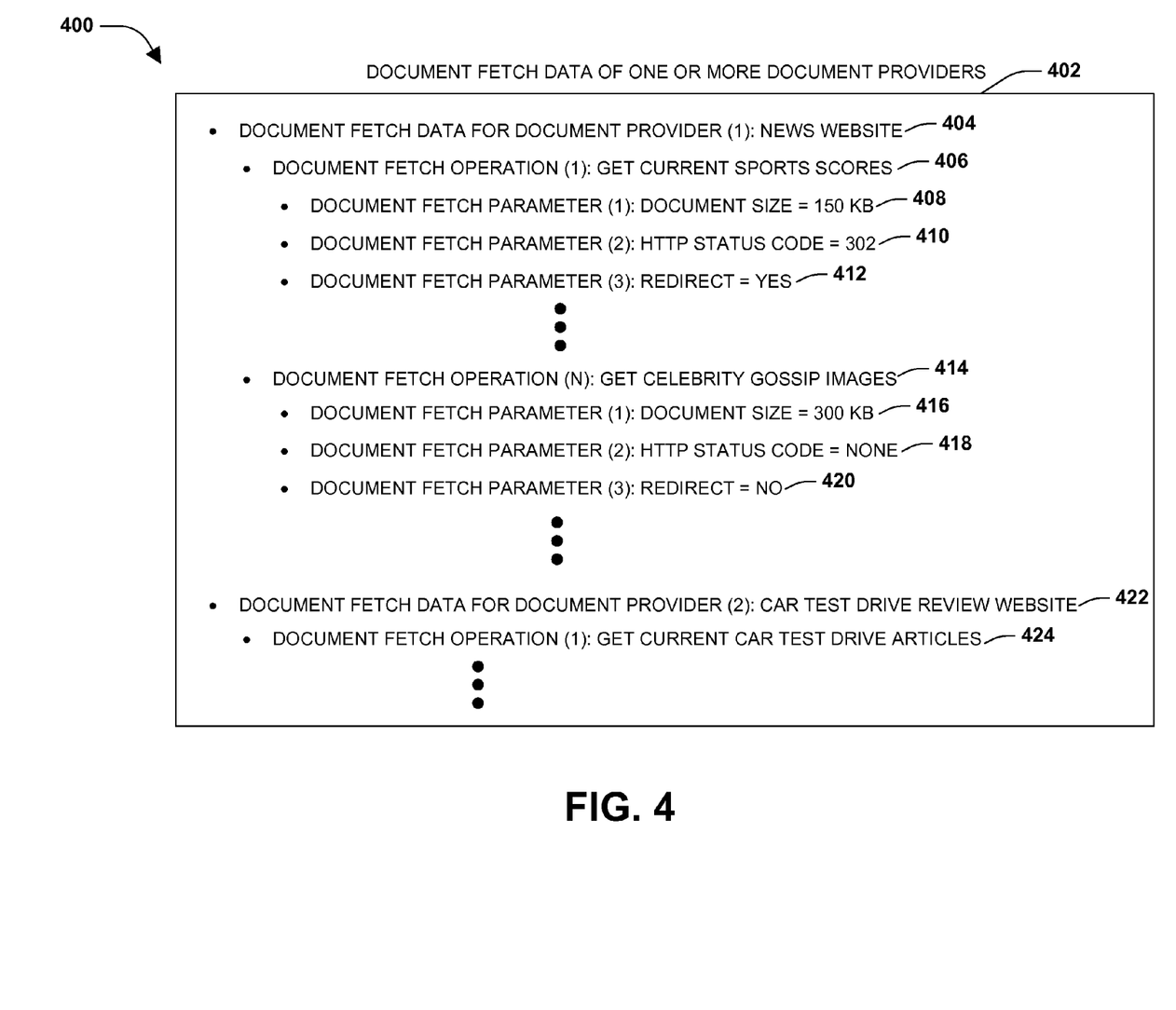
FIG. 4 is an illustration of an example of document fetch data of one or more document providers.

FIG. 4 illustrates an example 400 of document fetch data of one or more document providers 402. Document fetch data may relate to document fetch parameters that arise during normal or expected document fetch operations to a document provider. In particular, document fetch data may comprise document fetch parameters for well known or well behaving document providers (e.g., a document provider that consistently returns desired documents during document fetch operations, as opposed to returning junk pages).

In one example, the document fetch data of one or more document providers 402 may comprise document fetch data for document provider (1) 404 (a news website), document fetch data for document provider (2) 422 (a car test drive review website), and/or document fetch data for other document providers (hundreds to thousands or more of document providers). The document fetch data for document provider (1) 404 may comprise document fetch parameters associated with document fetch operations (e.g., parameters associated with hundreds to thousands of previous document fetch operations). For example, a previous document fetch operation (1) 406 may have been performed to get current sports scores from the document provider (1) (news website). One or more document fetch parameters may have been associated with the previous document fetch operation (1) 406. For example, a document fetch parameter (1) 408 comprising a document size of 150 kb, a document fetch parameter (2) 410 comprising an http status code of 302, a document fetch parameter (3) 412 comprising a redirect of yes, and/or other document fetch parameters may be associated with the previous document fetch operation (1) 406.

It may be appreciated that an integer value (N) of document fetch operations may be associated with the document fetch data for document provider (1) 404 (news website). For example, a previous document fetch operation (N) 414 may have been performed to get celebrity gossip images from the document provider (1) (news website). One or more document fetch parameters may have been associated with the previous document fetch operation (N) 414. For example, a document fetch parameter (1) 416 comprising a document size of 300 kb, a document fetch parameter (2) 418 comprising an http status code of none, a document fetch parameter (3) 420 comprising a redirect of no, and/or other document fetch parameters may be associated with the previous document fetch operation (N) 414.

The document fetch data of one or more document providers 402 may comprise document fetch data of other document providers, such as document fetch data for document provider (2) 422 (a car test drive review website). The document fetch data for document provider (2) 422 may comprise document fetch parameters associated with one or more document fetch operations. For example, a previous document fetch operation (1) 424 may have been performed to get current car test drive articles from the document provider (2) (car test drive review website). The previous document fetch operation (1) 424 may comprise one or more document fetch parameters. It may be appreciated that an integer value (N) of document fetch operations having one or more document fetch parameter may be associated with document fetch data for document provider (2) 422.

Figure 5:
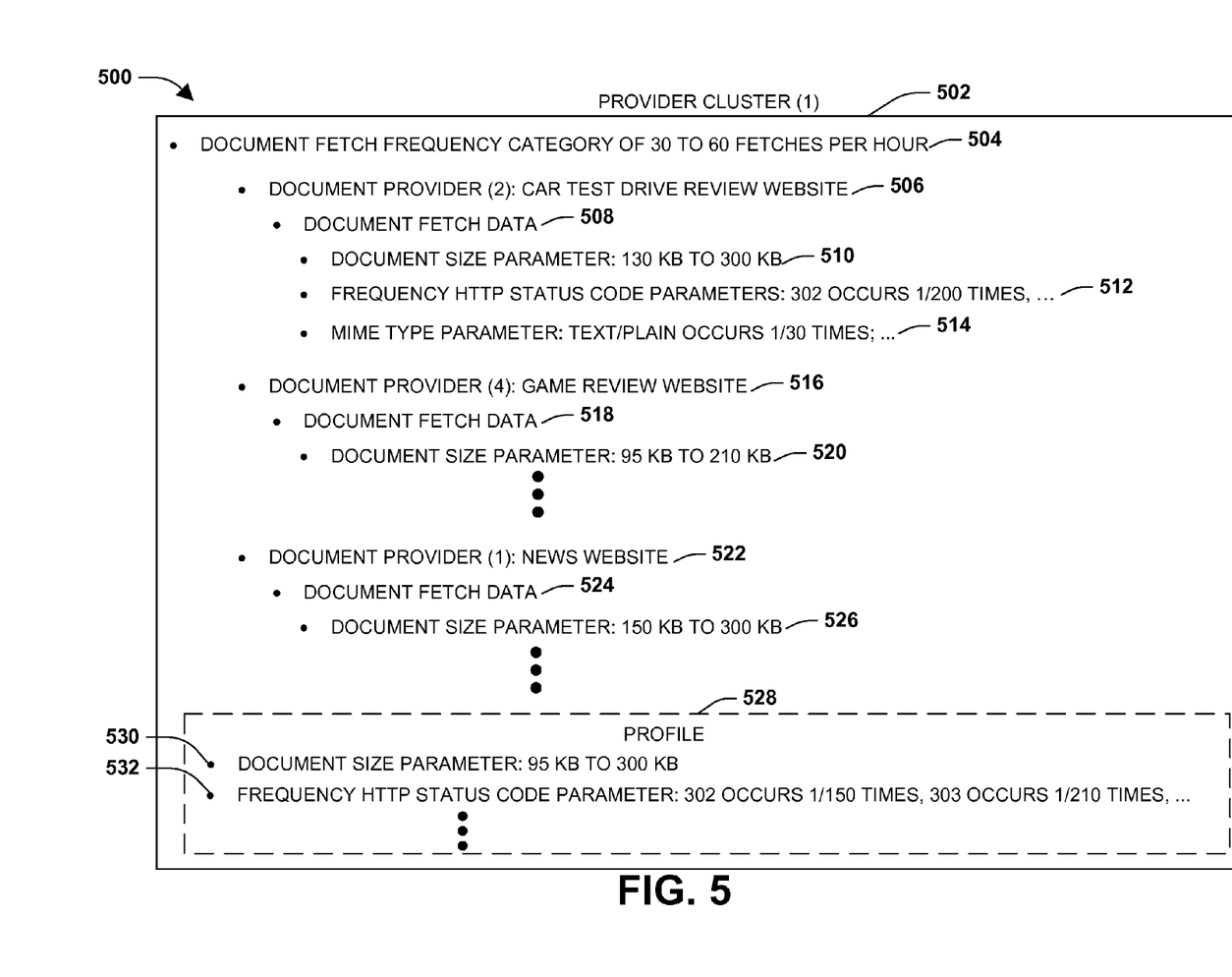
FIG. 5 is an illustration of an example of a provider cluster having a profile.

FIG. 5 illustrates an example 500 of a provider cluster having a profile 528. It may be appreciated that document providers may be grouped into provider clusters based upon document fetch data (e.g., document fetch data of one or more document providers 402 of FIG. 4). Profiles may be assigned to the provider clusters based upon document fetch parameters of the document providers within the respective provider clusters. A profile may comprise parameters that may be used as reference points that may be compared with current document fetch parameters of current document fetch operations to determine whether a document provider is returning desired documents.

Provider cluster (1) 502 may comprise one or more document providers grouped within the provider cluster (1) 502. In one example, document provider (2) 506 (car test drive review website), document provider (4) 516 (game review website), document provider (1) 522 (news website), and/or other document providers may be grouped into the provider cluster (1) 502. For example, document provider (2) 506, document provider (4), document provider (1), and/or other document providers may have been grouped into provider cluster (1) 502 because respective document providers had document fetch frequencies between 30 to 60 fetches per hours, which corresponded to the document fetch frequency category 504 of 30 to 60 fetches per hour.

The profile 528 may be specified for the provider cluster (1) 502 based upon document fetch data of the document providers within the provider cluster (1) 502. For example, document fetch data 508 for document provider (2) 506 may comprise document fetch parameters (e.g., average document size parameter 510, frequency http status code parameters 512, mime type parameters 514, etc.). Document fetch data 518 for document provider (4) may comprise document fetch parameters (e.g., document size parameter 520, etc.). Document fetch data 524 for document provider (1) may comprise document fetch parameters (e.g., document size parameter 526, etc.). The document fetch parameters illustrated in example 500 may be a "combined summary" (e.g., an average size value, a frequency of occurrences of http status codes, a redirect rate, etc.) of document fetch parameters of one or more document fetch operations.

The profile 528 may comprise parameters derived from document fetch parameters of the document providers within the provider cluster (1) 502. For example, a document size parameter 530 of 95 kb to 300 kb may have been derived from document size parameter 510 of document provider (2) 506, document size parameter 520 of document provider (4) 516, a document size parameter 526 of document provider (1) 522, and/or other document size providers of other document providers within provider cluster (1). The profile 518 may comprise other parameters, such as a frequency http status code parameter. In this way, the profile 528 may comprise parameters that may be compared with parameters of subsequent document fetch operations to document providers within the provider cluster (1) 502 to generate alerts when discrepancies arise, so that undesired documents are not retained by web crawlers and/or provided as search results.

Figure 6:
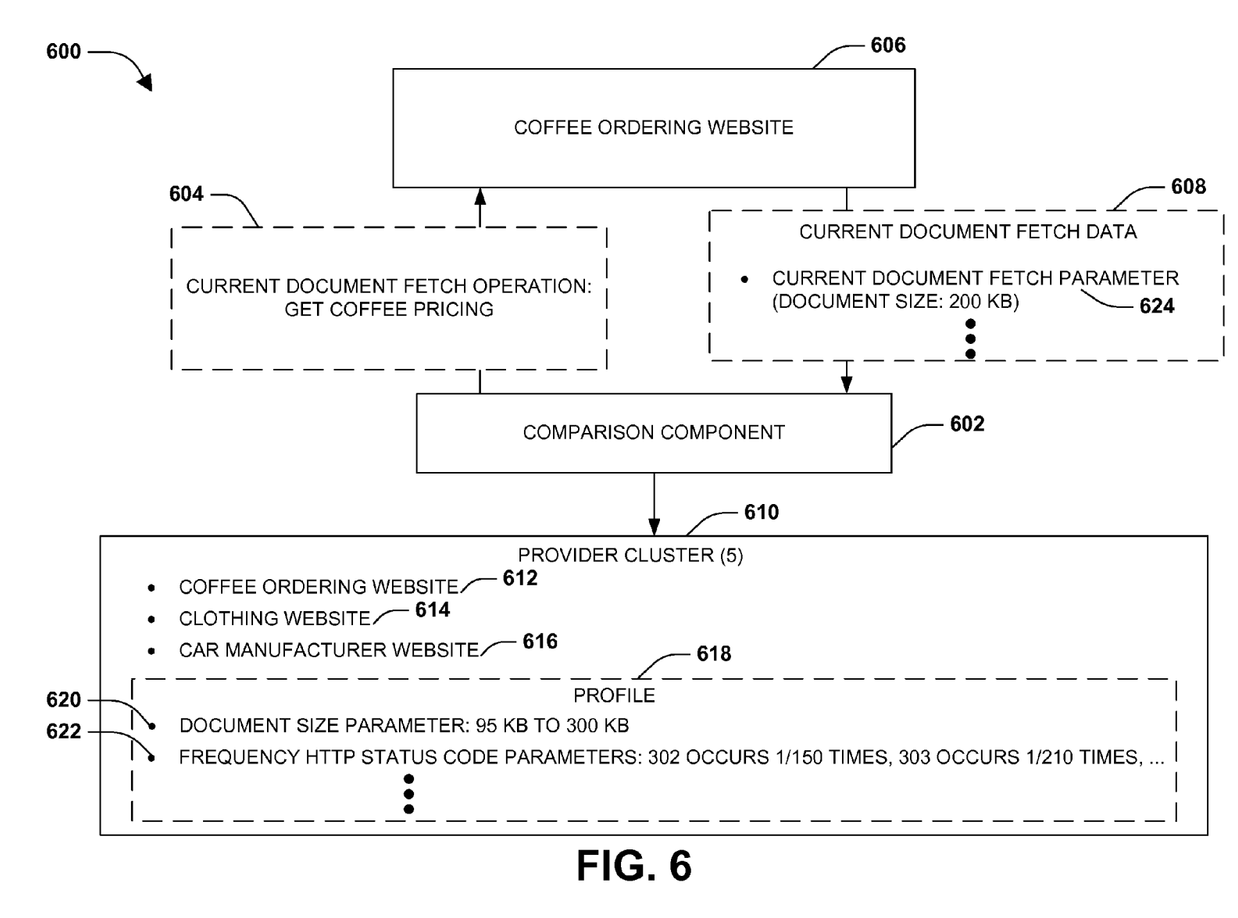
FIG. 6 is an illustration of an example of a comparison component comparing current document fetch parameters to parameters of a profile.

FIG. 6 illustrates an example 600 of a comparison component 602 comparing current document fetch parameters to parameters of a profile 618. In particular, the comparison component 602 may perform a current document fetch operation 604 to get a document relating to coffee pricing from a coffee ordering website 606 (e.g., the comparison component 602 may invoke a web crawler to retrieve the document). In response to the current document fetch operation 604, the coffee ordering website 606 may return data (e.g., a desired document, an error message, an undesired document-junk page, no response, etc.). Current document fetch data 608 comprising current document fetch parameters may be determined from the returned data and/or the current document fetch operation 604 (e.g., current document fetch parameters may be extracted from http header data). For example, the current document fetch data 608 may comprise a current document fetch parameter 624 having a document size parameter of 200 kb.

It may be appreciated that the provider cluster (5) 610 may comprise one or more document providers (e.g., coffee ordering website 612, clothing website 614, car manufacturer website 616, etc.), along with the profile 618 comprising parameters derived from document fetch parameters of the document providers within the provider cluster (5) 610. The comparison component 602 may compare the current document fetch parameters (e.g., current document fetch parameter 624) associated with the current document fetch operation 604 with parameters (e.g., a document size parameter 620, a frequency http status code parameter 622, etc.) of profile 618 associated with the provider cluster (5) 610 comprising the coffee ordering website 612. For example, the current document fetch parameter 624 having a document size parameter of 200 kb may be compared with the document size parameter 620 within the profile 618. The comparison component 602 may determine there is no discrepancy between the current document fetch parameter 624 and the document size parameter 520 because 200 kb falls within the range of 95 kb to 300 kb. Thus, in regard to document size, the document returned by the coffee ordering website 606 may be within an expected range of values. It may be appreciated that other current document fetch parameters may be compared with other parameters of the profile 618.

Figure 7:
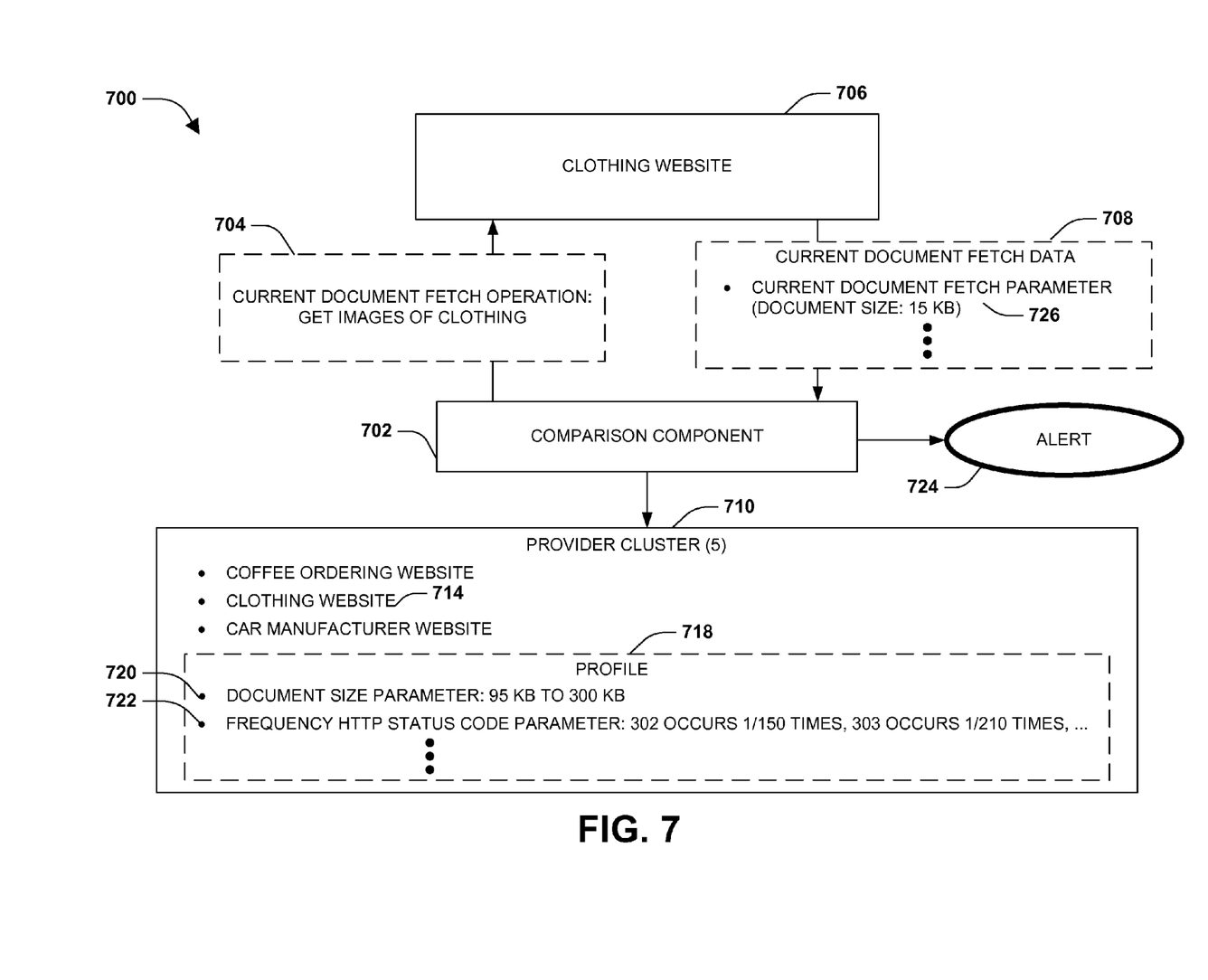
FIG. 7 is an illustration of an example of a comparison component generating an alert based upon comparing a current document fetch parameter to parameters of a profile.

FIG. 7 illustrates an example 700 of a comparison component 702 generating an alert 724 based upon comparing a current document fetch parameter 726 to parameters of a profile 718. The comparison component 702 may perform a current document fetch operation 704 to get a document relating to images of clothing from a clothing website 706. The clothing website 706 may return data, such as a document. Current document fetch data 708 comprising current document fetch parameters may be determined from the returned data and/or the current document fetch operation 704. For example, a current document fetch parameter 726 having a document size parameter of 15 kb may be determined within the current document fetch data 708.

It may be appreciated that the provider cluster (5) 710 may comprise one or more document providers (e.g., coffee ordering website, clothing website 714, car manufacturer website, etc.), along with the profile 718 comprising parameters derived from document fetch parameters of the document providers within the provider cluster (5) 710. The comparison component 702 may compare the current document fetch parameters associated with the current document fetch operation 704 with parameters (e.g., document size parameter 720, frequency http status code parameter 722, etc.) of profile 718 associated with provider cluster (5) 710 comprising the clothing website 714. For example, the current document fetch parameter 726 having a document size parameter of 15 kb may be compared with the document size parameter 720 within the profile 718. An alert 724 may be generated based upon a discrepancy between the respective parameters because the document size of 15 kb is not within the "expected" document size range of 95 kb to 300 kb.

Further action may be taken based upon the alert 724. In one example, the clothing website 706 may be manually evaluated to determine whether the clothing website 706 is returning undesired documents. In another example, the document relating to the images of clothing may be excluded from future search results of a search engine, the clothing website may be regrouped into a different cluster and/or the profile of the cluster may be updated, etc.

Figure 8:
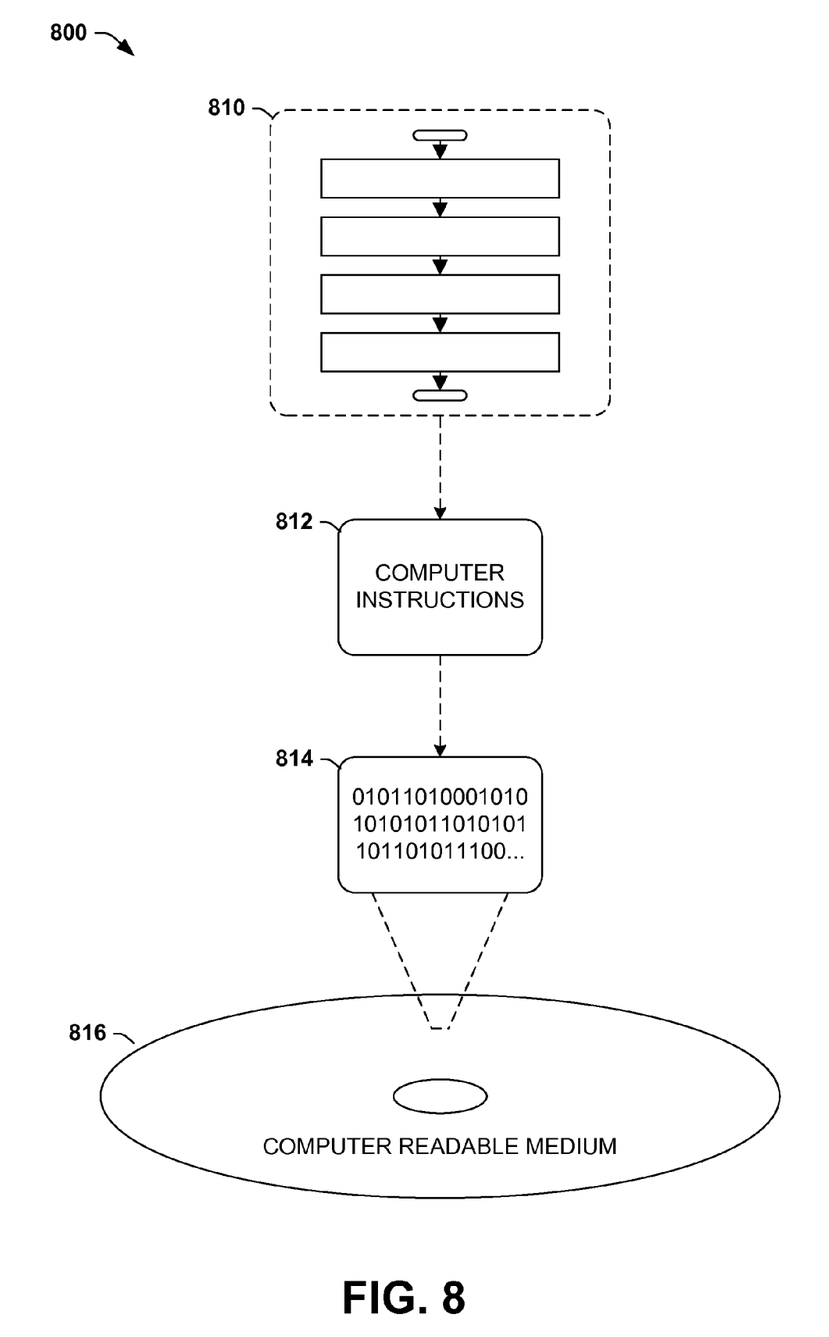
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as the exemplary method 100 of FIG. 1 and/or method 200 of FIG. 2, for example. In another such embodiment, the processor-executable instructions 812 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
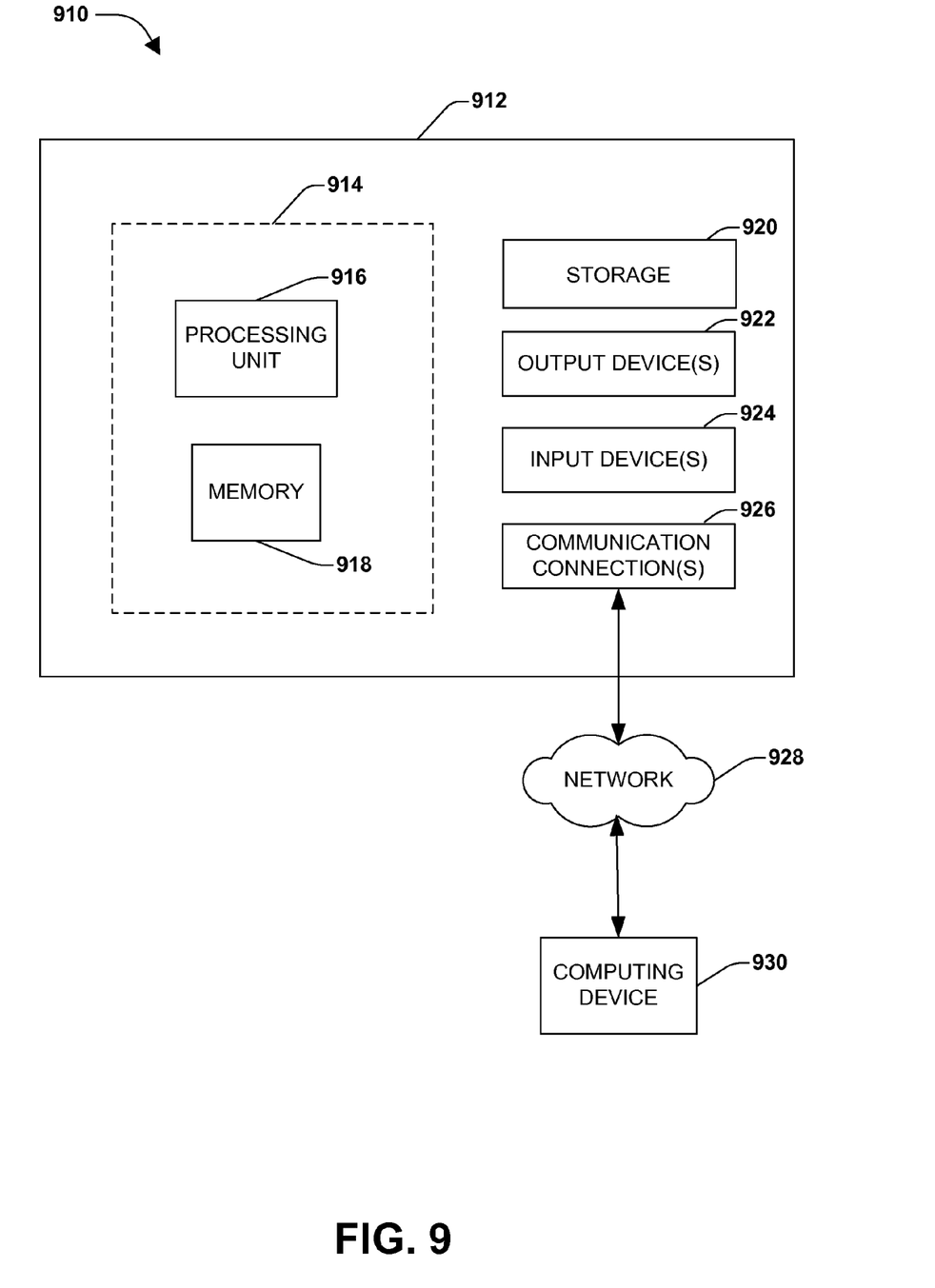
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
 receiving document fetch data of one or more document providers, document fetch data of a document provider comprising one or more document fetch parameters corresponding to document fetch operations associated with the document provider;
 grouping two or more document providers into a provider cluster based upon at least some document fetch data; and
 specifying a profile for the provider cluster based upon at least some document fetch parameters of the two or more document providers, the profile comprising one or more parameters corresponding to at least one of a document size parameter, a frequency http status code parameter, a mime type parameter or a redirect rate parameter.

2. The method of claim 1, the grouping comprising:
 placing into the provider cluster one or more document providers having a document fetch frequency corresponding to a document fetch frequency category of the provider cluster.

3. The method of claim 1, the receiving comprising:
determining document fetch parameters for the document provider based upon one or more http headers associated with document fetch operations to the document provider.

4. The method of claim 1, the specifying comprising:
specifying a parameter having a range of acceptable values.

5. The method of claim 1, comprising:
performing a current document fetch operation to a first document provider within the provider cluster to fetch a document, the current document fetch operation associated with current document fetch data comprising current document fetch parameters;
comparing the current document fetch parameters of the current document fetch operation with parameters of the profile associated with the provider cluster comprising the first document provider; and
if the comparison indicates a discrepancy between the current document fetch parameters and at least some of the one or more of the parameters of the profile, then generating an alert.

6. The method of claim 1, comprising:
performing a plurality of current document fetch operations to a first document provider within the provider cluster to generate computed current document fetch parameters;
comparing the computed current document fetch parameters associated with the first document provider with parameters of the profile associated with the provider cluster comprising the first document provider; and
if the comparison indicates a discrepancy between the computed current document fetch parameters and at least some of the one or more of the parameters of the profile, then generating an alert.

7. The method of claim 6, a computed current document fetch parameter comprising a computed average of a current document fetch parameter and a computed standard deviation of the current document fetch parameter.

8. The method of claim 6, comprising:
regrouping the first document provider into a new provider cluster based upon a frequency of alerts for the first document provider rising above a predetermined threshold.

9. The method of claim 6, comprising:
updating the profile of the provider cluster based upon the first document provider within the provider cluster having a frequency of alerts rising above a predetermined threshold.

10. The method of claim 6, comprising:
throttling a frequency of performing current document fetch operations to the first document provider based upon a frequency of alerts for the first document provider rising above a predetermined threshold.

11. The method of claim 5, comprising:
comparing the current document fetch parameters with parameters of the profile in real-time during a web crawl session comprising the current document fetch operation.

12. A system, implemented at least in part via a processing unit, comprising:
a provider clustering component configured to:
retrieve document fetch data of one or more document providers, document fetch data of a document provider comprising one or more document fetch parameters corresponding to document fetch operations associated with the document provider; and
group two or more document providers into a provider cluster based upon at least some document fetch data; and
a profile specifying component configured to:
specify a profile for the provider cluster based upon at least some document fetch parameters of the two or more document providers, the profile comprising one or more parameters corresponding to at least one of a document size parameter, a frequency http status code parameter, a mime type parameter or a redirect rate parameter.

13. The system of claim 12, comprising:
a comparison component configured to:
perform a current document fetch operation to a first document provider within the provider cluster to fetch a document, the current document fetch operation associated with current document fetch data comprising current document fetch parameters;
compare the current document fetch parameters of the current document fetch operation with parameters of the profile associated with the provider cluster comprising the first document provider; and
if the comparison indicates a discrepancy between the current document fetch parameters and at least some of the one or more parameters of the profile, then generate an alert.

14. The system of claim 13, the comparison component configured to:
perform a plurality of current document fetch operations to a second document provider within the provider cluster to generate computed current document fetch parameters;
compare the computed current document fetch parameters associated with the second document provider with parameters of the profile associated with the provider cluster comprising the second document provider; and
if the comparison indicates a discrepancy between the computed current document fetch parameters and at least some of the one or more parameters of the profile, then generate a second alert.

15. The system of claim 12, the provider clustering component configured to:
place into the provider cluster one or more document providers having a document fetch frequency corresponding to a document fetch frequency category of the provider cluster.

16. The system of claim 13, the profile specifying component configured to:
regroup the first document provider into a new provider cluster based upon a frequency of alerts for the first document provider rising above a predetermined threshold.

17. The system of claim 13, the profile specifying component configured to:
update the profile of the provider cluster based upon the first document provider within the provider cluster having a frequency of alerts rising above a predetermined threshold.

18. The system of claim 13, comprising:
a throttling component configured to:
throttle a frequency of performing current document fetch operations to the first document provider based upon a frequency of alerts for the first document provider rising above a predetermined threshold.

19. The system of claim 13, the comparison component configured to:
- compare the current document fetch parameters with parameters of the profile in real-time during a web crawl session comprising the current document fetch operation.

20. A computer readable medium comprising instructions that when executed, perform a method for comparing current document fetch parameters with parameters of a profile, comprising:
- performing a current document fetch operation to a document provider to fetch a document, the current document fetch operation associated with current document fetch data comprising current document fetch parameters;
- comparing the current document fetch parameters of the current document fetch operation with parameters of a profile associated with a provider cluster comprising the document provider and one or more other document providers; and
- if the comparison indicates a discrepancy between the current document fetch parameters and at least some of one or more parameters of the profile, then generating an alert.

\* \* \* \* \*